United States Patent
Lieske et al.

(10) Patent No.: US 8,683,106 B2
(45) Date of Patent: Mar. 25, 2014

(54) CONTROL APPARATUS FOR FAST INTER PROCESSING UNIT DATA EXCHANGE IN AN ARCHITECTURE WITH PROCESSING UNITS OF DIFFERENT BANDWIDTH CONNECTION TO A PIPELINED RING BUS

(75) Inventors: Hanno Lieske, Tokyo (JP); Shorin Kyo, Tokyo (JP)

(73) Assignee: NEC Corporation, Tokyo (JP)

( * ) Notice: Subject to any disclaimer, the term of this patent is extended or adjusted under 35 U.S.C. 154(b) by 574 days.

(21) Appl. No.: 12/919,633

(22) PCT Filed: Mar. 3, 2008

(86) PCT No.: PCT/JP2008/054224
§ 371 (c)(1),
(2), (4) Date: Aug. 26, 2010

(87) PCT Pub. No.: WO2009/110100
PCT Pub. Date: Sep. 11, 2009

(65) Prior Publication Data
US 2011/0010526 A1    Jan. 13, 2011

(51) Int. Cl.
G06F 13/14    (2006.01)
G06F 13/40    (2006.01)

(52) U.S. Cl.
USPC .......................................... 710/305; 710/307

(58) Field of Classification Search
USPC .................................................. 710/305, 307
See application file for complete search history.

(56) References Cited

U.S. PATENT DOCUMENTS

| | | | |
|---|---|---|---|
| 3,537,074 A | 10/1970 | Stokes et al. | |
| 4,837,676 A | 6/1989 | Rosman | |
| 5,212,777 A | 5/1993 | Gove et al. | |
| 5,239,654 A | 8/1993 | Ing-Simmons et al. | |
| 5,355,508 A | 10/1994 | Kan | |
| 5,522,083 A | 5/1996 | Gove et al. | |
| 5,684,959 A | 11/1997 | Bhat et al. | |
| 5,903,771 A | 5/1999 | Sgro et al. | |
| 6,049,859 A * | 4/2000 | Gliese et al. | 712/17 |
| 6,473,086 B1 * | 10/2002 | Morein et al. | 345/505 |
| 6,487,651 B1 | 11/2002 | Jackson et al. | |
| 6,493,784 B1 * | 12/2002 | Kamimura et al. | 710/309 |
| 7,031,324 B1 * | 4/2006 | Goody | 370/401 |
| 8,015,384 B2 * | 9/2011 | Jobs et al. | 711/170 |
| 2002/0112119 A1 * | 8/2002 | Halbert et al. | 711/115 |
| 2007/0018079 A1 | 1/2007 | Irisa | |
| 2007/0127553 A1 * | 6/2007 | Miller et al. | 375/130 |

FOREIGN PATENT DOCUMENTS

| | | | |
|---|---|---|---|
| JP | H0668053 A | 3/1994 | |
| JP | 8-298517 A | 11/1996 | |
| JP | 2006107022 A | 4/2006 | |

OTHER PUBLICATIONS

International Search Report for PCT/JP2008/054224 mailed Nov. 24, 2008.

E. Waingold et al., "Baring it all to Software: The Raw Machine", MIT/LCS Technical Report TR-709, Mar. 1997, pp. 1-28.

(Continued)

Primary Examiner — Nimesh G Patel
(74) Attorney, Agent, or Firm — Sughrue Mion, PLLC

(57) ABSTRACT

Nowadays, many architectures have processing units with different bandwidth requirements which are connected over a pipelined ring bus. The proposed invention can optimize the data transfer for the case where processing units with lower bandwidth requirements can be grouped and controlled together for a data transfer, so that the available bus bandwidth can be optimally utilized.

17 Claims, 10 Drawing Sheets

(56) References Cited

OTHER PUBLICATIONS

J. A. Kahle et al., "introduction to the Cell multiprocessor". IBM Journal of Research and Development, vol. 49, No. 4/5, Jul./Sep. 2005, pp. 589-604.

K. Kyo et al., "A Low Cost Mixed-Mode Parallel Processor Architecture for Embedded Systems". ICS'07, Jun. 18-20, 2007, pp. 253-262.

T. W. Ainsworth et al, "Characterizing the Cell EIB On-Chip Network", IEEE Micro, IEEE Service Center, vol. 27, No. 5, Sep. 2007, pp. 6-14.

P. Liljeberg et al., "Self-timed communication platform for implementing high-performance systems-on-chip", Integration, The VSLI Journal, vol. 38, No. 1, Oct. 2004, pp. 43-67.

K Vedder et al., "Smart Cards—Requirements, Properties, and Appiications", State of the Art in Appplied Cryptography, Course on Computer Security and Industrial Cryptography, Springer-Verlag Berlin, X002503200, 1998, pp. 307-331.

Japanese Office Action for JP2010-534705 mailed on Nov. 13, 2012.

Japanese Office Action for JP Application No. 2010-534705 mailed on Jul. 9, 2013 with Partial English Translation.

* cited by examiner

CONTROL APPARATUS FOR FAST INTER PROCESSING UNIT DATA EXCHANGE IN AN ARCHITECTURE WITH PROCESSING UNITS OF DIFFERENT BANDWIDTH CONNECTION TO A PIPELINED RING BUS

The present application is the National Phase of PCT/JP2008/054224, filed Mar. 3, 2008.

FIELD OF THE INVENTION

The present invention relates to a control apparatus in an architecture with processing elements, each can be connected with a bandwidth of $x \in IN_{>0}$ times base bandwidth $B_B$, grouped to processing units, which are arranged sequentially in a pipelined ring bus, to reach a fast inter processing unit data exchange capability.

BACKGROUND

Over the time, many processors operating in single instruction, multiple data (SIMD) (Reference 1) or multiple instructions, multiple data (MIMD) (Reference 2) style have been proposed. Many upcoming algorithms, like for example H.264, consist of a number of sub algorithms which follow partly the SIMD and partly the MIMD control style. Therefore, a number of different dual mode SIMD/MIMD architectures were developed (Reference 3-Reference 9). However, all these architectures have in common a complex data transfer network, which requires large amount of wiring area. An alternative approach was used inside the Cell processor, a processor which uses a pipelined ring bus as data network (Reference 10), which reduces the wiring area needs for the data transfer network.

All mentioned designs have in common, that the processing units (PU) are connected with the same bandwidth to the data transfer network. When however looking on nowadays complex algorithms, like for example H.264, it can be seen, that some parts of the algorithm require higher data bandwidth than other parts. Also, when looking on new arising architectures, like for example the one explained in Reference 11, different data bandwidth connections to the data transfer network can be observed for processing elements (PE) working in SIMD mode and autonomous working processing units (APU), which consist of four PE, working in MIMD mode.

The references are listed below.

[Reference 1]
R. A. Stokes et al, "Parallel operating array computer", U.S. Pat. No. 3,537,074, Oct. 27, 1970
[Reference 2]
A. Rosman, "MIMD instruction flow computer architecture", U.S. Pat. No. 4,837,676, Jun. 6, 1989
[Reference 3]
R. J. Gove et al, "Multi-processor reconfigurable in single instruction multiple data (SIMD) and multiple instruction multiple data (MIMD) modes and method of operation", U.S. Pat. No. 5,212,777, May 18, 1993
[Reference 4]
N. K. Ing-Simmons et al, "Dual mode SIMD/MIMD processor providing reuse of MIMD instruction memories as data memories when operating in SIMD mode", U.S. Pat. No. 5,239,654, Aug. 24, 1993
[Reference 5]
R. J. Gove et al, "Reconfigurable multi-processor operating in SIMD mode with one processor fetching instructions for use by remaining processors", U.S. Pat. No. 5,522,083, May 28, 1996
[Reference 6]
J. A. Sgro et al, "Scalable multi-processor architecture for SIMD and MIMD operations", U.S. Pat. No. 5,903,771, May 11, 1999
[Reference 7]
T. Kan, "Parallel data processing system combining a SIMD unit with a MIMD unit and sharing a common bus, memory, and system controller", U.S. Pat. No. 5,355,508, Oct. 11, 1994
[Reference 8]
J. H. Jackson et al, "MIMD arrangement of SIMD machines", U.S. Pat. No. 6,487,651, Nov. 26, 2002
[Reference 9]
E. Waingold, "Baring it all to software: The Raw Machine", MIT/LCS Technical Report TR-709, March 1997, pp. 1-28
[Reference 10]
J. A. Kahle, "Introduction to the Cell multiprocessor", IBM Journal of Research and Development Volume 49, Number 4/5, July/September 2005, pp. 589-604
[Reference 11]
S. Kyo, "A Low Cost Mixed-mode Parallel Processor Architecture for Embedded Systems", ICS, June 2007, pp. 253-262

SUMMARY OF THE DISCLOSURE

The following analyses are given by the present invention. All the disclosures of above mentioned references are incorporated herein by reference thereto.

All these approaches, whether connected with same or different bandwidth to the transfer network, have in common that they control each data transfer separately using one source control unit and one destination control unit or, when broadcasting the same data, using one source control unit and several destination control units.

It is an object of the present invention, to utilize more efficiently the available network data bandwidth.

Other objects will become apparent in the entire disclosure.

The optimization is done by area efficiently controlling together a set of i independently controlled processing units with lower bandwidth connection $B_{Li}$ when transferring over the pipelined ring bus data between this set of processing units and a single processing unit with higher bandwidth connection $B_H$, so that $\Sigma_{i \in set\ of\ PU} B_{Li} = B_H$.

More specifically, in a first aspect of the present invention, there is provided a processing system having an architecture with a base bandwidth $B_B$. The processing system comprises: a pipelined network connection formed as a ring with a bandwidth $B_{BUS}$ which is a multiple of the base bandwidth $B_B$ and with $(B_{BUS}/B_B) \in IN_{>1}$, where "/" represents the integer division and $IN_{>1}$ represents natural number larger than 1, to enable the possibility to transfer multiple data sets with the base bandwidth $B_B$ at the same time. More precisely, the bandwidth $B_{BUS}$ is defined by $(B_{BUS}\ \%\ B_B)=0$, wherein "%" represents the modulo operation, to make sure that $B_{BUS}$ is a multiple of $B_B$.

The system further comprises: processing elements with possibly different bandwidth connection $(x_{PE}*B_B)$ with $x_{PE} \in IN_{>0}$ to the pipelined ring network, where $IN_{>0}$ represents natural number; and processing units, formed of one or several processing elements which are grouped and controlled together, with different bandwidth connection $(x_{PU}*B_B)$ with $x_{PU} \in IN_{>0}$ to the pipelined ring network. The system comprises a control apparatus controlling over the pipelined ring network; a fast data spreading transfer mode with one sending unit and a plurality of receiving processing units, wherein the bandwidth connection of the sending processing unit equals the sum of the bandwidth connections of the plurality of receiving processing units; and/or a fast data collection transfer mode with a plurality of sending processing units and one receiving processing unit, wherein the sum of the bandwidth connections of the sending processing units equals the bandwidth connection of the receiving processing unit.

In a second aspect of the present invention, there is provided a processing method using an architecture with a base bandwidth $B_B$. The method comprises: providing a pipelined network connection formed as a ring with a bandwidth $B_{BUS}$ which is a multiple of the base bandwidth $B_B$ and with $(B_{BUS}/B_B) \in IN_{>1}$, where "/" represents the integer division and $IN_{>1}$ represents natural number larger than 1, to enable the possibility to transfer multiple data sets with the base bandwidth $B_B$ at the same time. The method further comprises: having processing elements with possibly different bandwidth connection $(x_{PE}*B_B)$ with $x_{PE} \in IN_{>0}$, where $IN_>$ represents natural number; and connecting processing units, formed of one or several processing elements which are grouped and controlled together, with different bandwidth connection $(x_{PU}*B_B)$ with $x_{PU} \in IN_>$ to the pipelined ring network. The control apparatus controls over the pipelined ring network; a fast data spreading transfer mode with one sending unit and a plurality of receiving processing units, wherein the bandwidth connection of the sending processing unit equals the sum of the bandwidth connections of the plurality of receiving processing units; and/or a fast data collection transfer mode with a plurality of sending processing units and one receiving processing unit, wherein the sum of the bandwidth connections of the sending processing units equals the bandwidth connection of the receiving processing unit.

The meritorious effects of the present invention are summarized as follows.

According to the present invention, there will be the positive effect that the network bandwidth can be more efficiently utilized in systems where independently controlled processing units with different bandwidth connection requirements are connected to a pipelined ring bus.

Further advantageous features of the present invention are recited in the dependent claims.

Any one of the processing units can work in a single instruction multiple data (SIMD) style.

The processing system may further comprise: a global control unit with access control lines that controls and arbitrates the data transfer demands coming from the processing units by executing data flow control sequences.

The controller may execute a data flow control sequence, where data is transferred in a fast data transfer mode from a single processing unit to many processing units with equal sender and receiver bandwidth B with
a.) $(B \% B_B) == 0$ and
b.) $(B/B_H) \in IN_{>1}$ and
c.) $(B <= B_{BUS})$.

The controller may also execute a data flow control sequence, where data is transferred in a fast data transfer mode from many processing units to a single processing unit with equal sender and receiver bandwidth B with
a.) $(B \% B_B) == 0$ and
b.) $(B/B_B) \in IN_{>1}$ and
c.) $(B <= B_{BUS})$.

A group or groups of processing elements can be arranged at run time to processing units.

Processing elements are configurable at run time to the SIMD or non-SIMD style.

Data which is generated in one processing unit may be divided in smaller parts which are transferred to multiple processing units at the same time.

Data which is generated in multiple processing units may be transferred at the same time to one processing unit where it is collected for further processing.

Data and associated control data may be generated in one processing unit then divided and transferred at the same time to different processing unit where it is needed for further processing.

PREFERRED MODES

Figure 1:
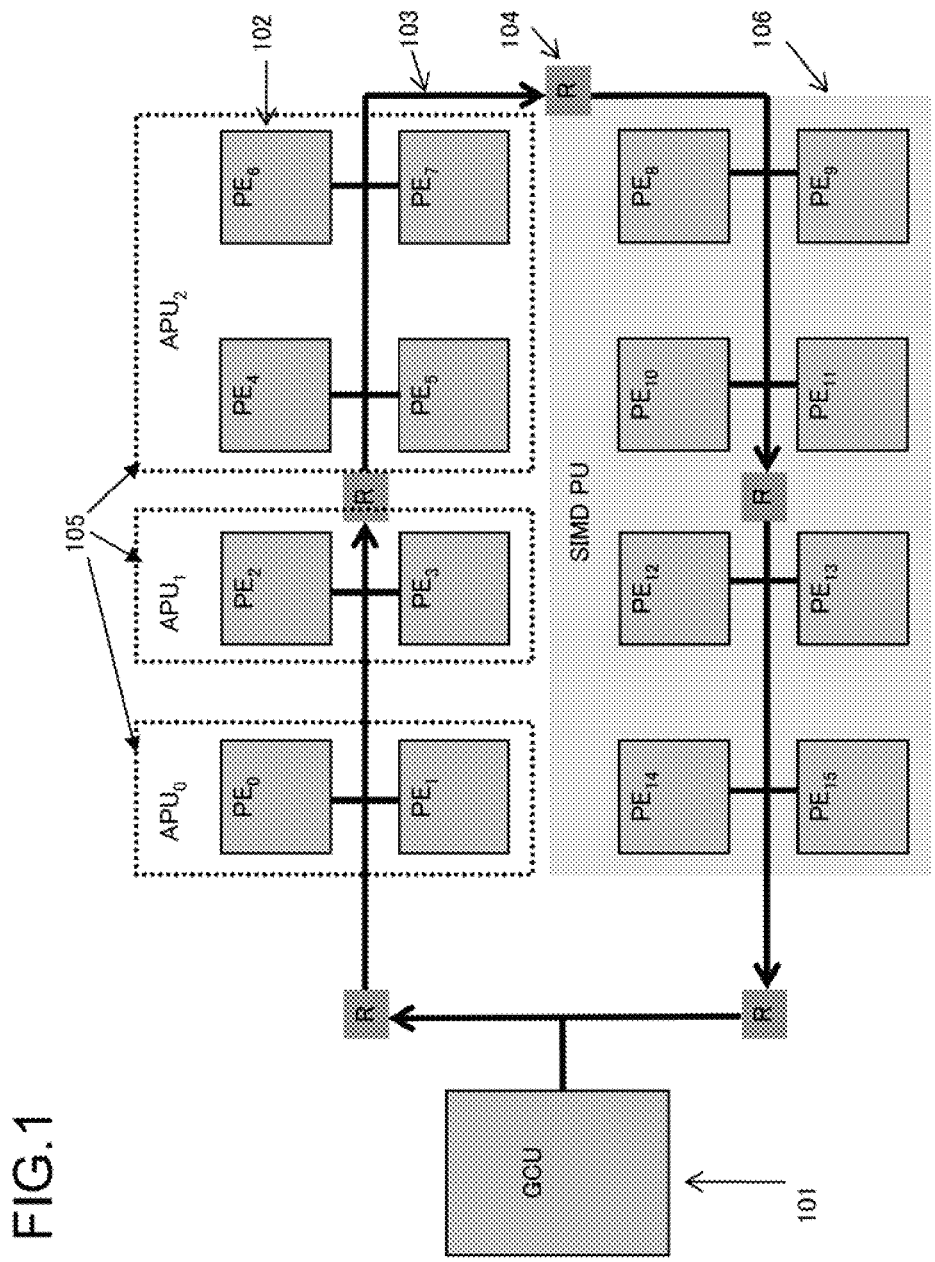
FIG. 1 is a schematic illustration of an example architecture consisting of a GCU, a pipelined ring bus and 16 PE, grouped together to larger PU.

FIG. 1 shows an example architecture implementation with global control unit (GCU) (101), an array of 16 processing elements (PE) (102) and a unidirectional pipelined bus system formed as a ring (103) with register R (104). This example architecture is configurable at run time and here one possible configuration is shown where the lower 8 PE are grouped to one processing unit (PU) which is working in single instruction multiple data (SIMD) style controlled by the GCU (106). The upper 8 PE are also grouped together to larger units, the autonomously working processing units (APU) (105). In this example, two times two PE are formed to an APU ($APU_0$ and $APU_1$) and one time four PE are formed to $APU_2$. The base bandwidth $B_B$ is equal to the bandwidth one PE connects to the bus system $B_B=B_{PE}$. This results for $APU_0$ and $APU_1$ in a bandwidth of $B_{APU0}=B_{APU1}=2*B_B$ and for $APU_2$ in a bandwidth which is $B_{APU2}=4*B_B$. To serve $APU_2$ with full data bandwidth in this example architecture, the pipelined ring bus as well as GCU have also a bandwidth of $B_{BUS}=B_{GCU}=4*B_B$.

Figure 2:
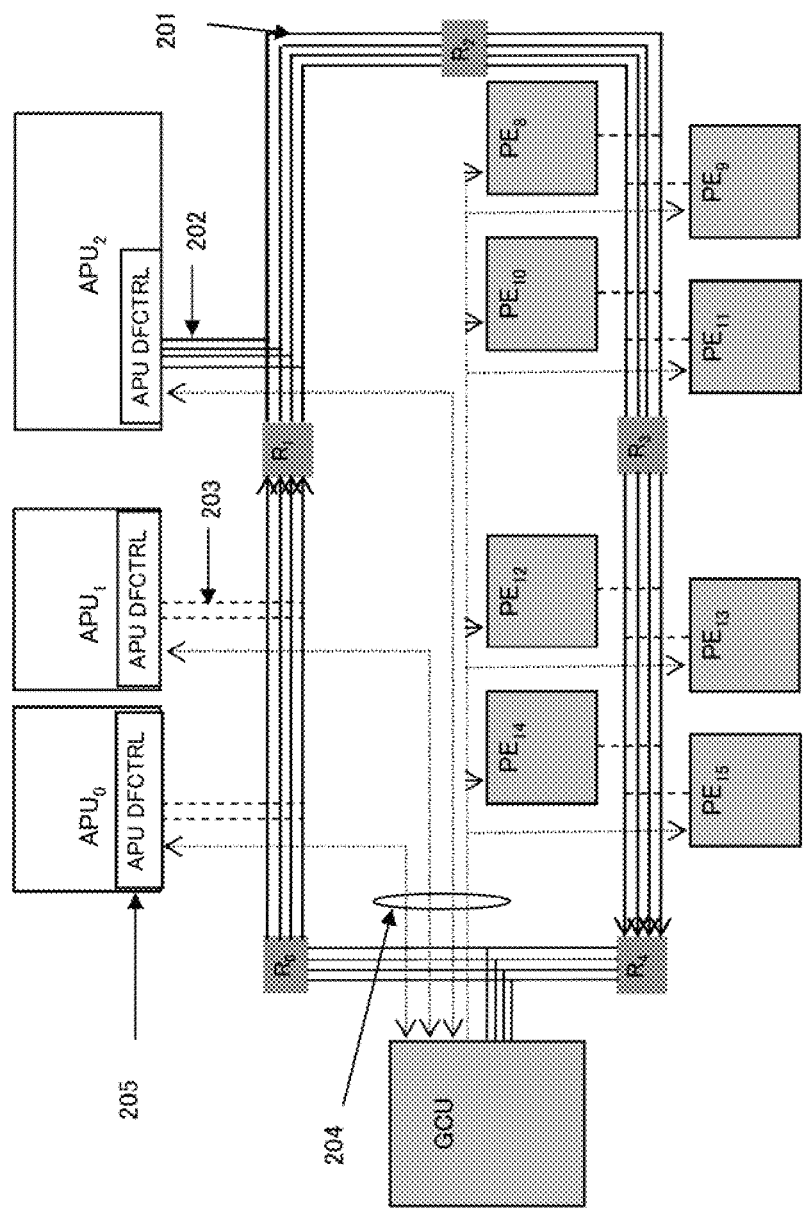
FIG. 2 is a more detailed illustration of the data and data flow control signals of the example architecture.

FIG. 2 shows for the example architecture the connection between each PU and the pipelined ring bus with width $B_{BUS}=4*B_B$ (201) in more detail. While modules, which have same bandwidth like the ring bus, are fixed connected (202), all other units are connected to the ring bus over a multiplexer (for sending data) respectively demultiplexer (for receiving data) (203) which is controlled from a data flow control unit (DFCTRL) to enable access to the whole ring bus bandwidth. A conventional data transfer in such kind of architecture fulfills following conditions:

a.) Data transfer bandwidth is set to the smallest supported bandwidth of all units taken part in the transfer (sending PU, network, receiving PU)

b.) Data is sent from one sending PU c.) Data word is received from one receiving PU or, in case of broadcast mode, the same data word is received from many receiving PU.

Additionally, control lines (204) are shown between the GCU and processing units (PUs). For an APU, over these control lines two type of signals are sent, first, request parameters transferred from the APU DFCTRL to GCU and second, acknowledge parameters including multiplexer setting transferred from GCU to APU DFCTRL. For a PE array in the SIMD PU, where the controlling is done by the SIMD DFCTRL inside the GCU, only multiplexer settings are sent from GCU to PE array (i.e. each of PEs).

Figure 3:
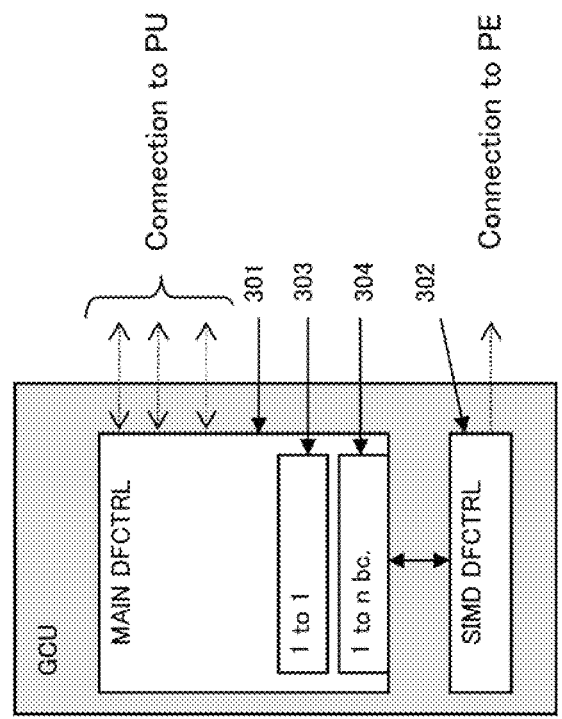
FIG. 3 is a schematic view of the GCU with supported conventional transfer modes.

FIG. 3 shows a schematic view of the GCU with supported conventional transfer modes. The GCU comprises two units, first, the SIMD DFCTRL unit (302), which is responsible for controlling the data flow to/from the global controlled PE array and second the MAIN DFCTRL unit (301), which receives the data transfer request signals from all DFCTRLs and directs then the way of data transfer by sending the acknowledge parameters to the requesting DFCTRL at correct time points. The two supported conventional transfer modes are the "1 to 1" (303) and "1 to n bc" (304) transfer mode. While with the "1 to 1" transfer mode data is sent controlled by one sending DFCTRL and one receiving DFCTRL, with the "1 to n bc" transfer mode the same data is sent in broadcast mode controlled by one sending DFCTRL and many receiving DFCTRLs.

Figure 4:
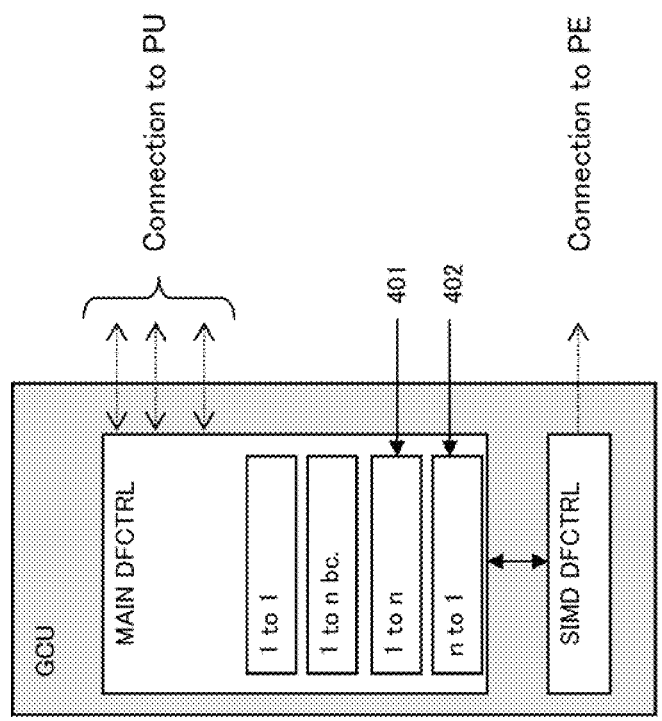
FIG. 4 is a schematic view of the GCU with supported conventional and new proposed transfer modes.

FIG. 4 shows a schematic view of the GCU with supported conventional and new proposed transfer modes. Additional to the two conventional transfer modes "1 to 1" and "1 to n bc", the two new transfer modes "1 to n" (401) and "n to 1" (402) with n∈IN$_{>1}$ are supported. With the "1 to n" transfer mode at the same time different data is transferred controlled by one sending DFCTRL and many receiving DFCTRLs, while with the "n to 1" transfer mode at the same time different data is transferred controlled by many sending DFCTRLs and one receiving DFCTRL.

EXAMPLES

One typical class of algorithms where these new transfer modes can be effectively used is, where data is generated in one PU and then the output data is divided in smaller parts which are sent to other PU (data spreading) or a number of PU are generating data and then the data is sent from these PU to one PU (data collection) for further processing.

As example for a data spreading transfer in our architecture, $APU_2$ produces 16 data words with bit width $B_B$ as output data. This output data is needed as input data from $APU_0$ and $APU_1$, which each needs eight data words.

Comparative Example 1

Figure 5:
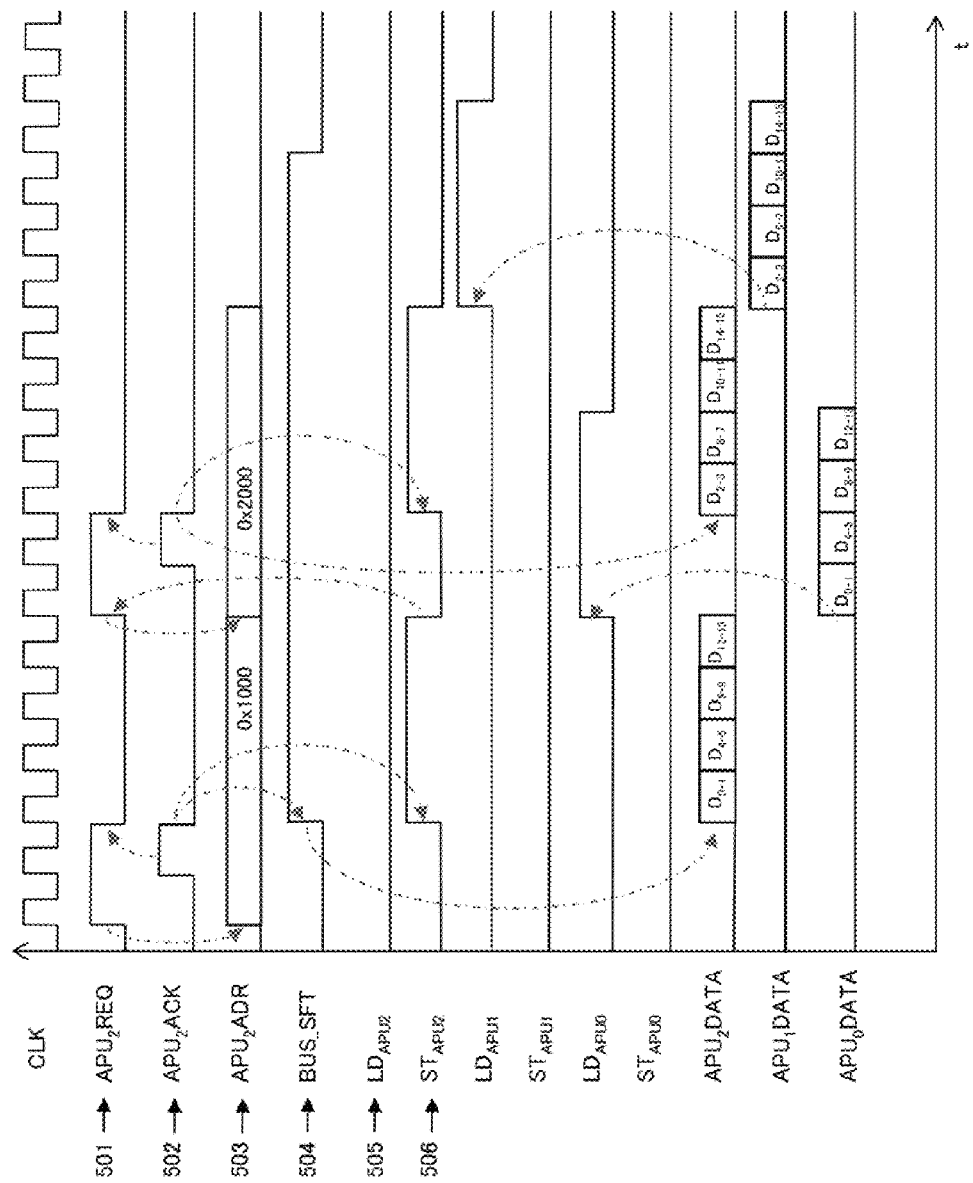
FIG. 5 is a timing chart (comparative example) of a data spreading transfer with conventional transfer modes.

In a conventional architecture the transfer would only use half of the ring bus bandwidth by transferring two data words each clock cycle as shown in FIG. 5, where both transfers run one after each other transferring first eight data words from $APU_2$ to $APU_0$ and then eight data words from $APU_2$ to $APU_1$.

In the transfer, the destination units are specified by the upper bits of the address signal, GCU=0x0, $APU_0$=0x1, $APU_1$=0x2, $APU_2$=0x4, PE array=0x8.

For the relations of edges between signals refer to the arrows illustrated FIGS. 5-10.

As described at 503 in FIG. 5, 0x1000 and 0x2000 are combined address and control signal. The last 12 bit are the address and the first bits are control signals to specify the destination unit, in which 0x1000 means address 0 in $APU_0$ and 0x2000 means address 0 in $APU_1$.

First, a request is sent from $APU_2$ with the destination address to the MAIN DFCTRL. At the timepoint, where the MAIN DFCTRL is sending the acknowledge signal, the request is taken away. Additionally, the two control signals are set to 1, the signal $ST_{APU2}$ to cause APU2 to put the data onto the ring bus and the signal BUS_SFT to shift the data on the ring bus. Because $ST_{APU2}$ is set to 1, $APU_2DATA$ is put from $APU_2$ onto the ring bus. When the data arrives at the destination unit defined by $APU_2ADR$ after passing the pipeline registers, the signals $LD_{APU0}$ and $LD_{APU1}$ respectively are set to 1 and the data is read from bus. With the four pipeline registers $R_2$, $R_3$, $R_4$, $R_0$ on the way from $APU_2$ to $APU_0/APU_1$ this takes overall 16 clock cycles.

Example 1

Figure 6:
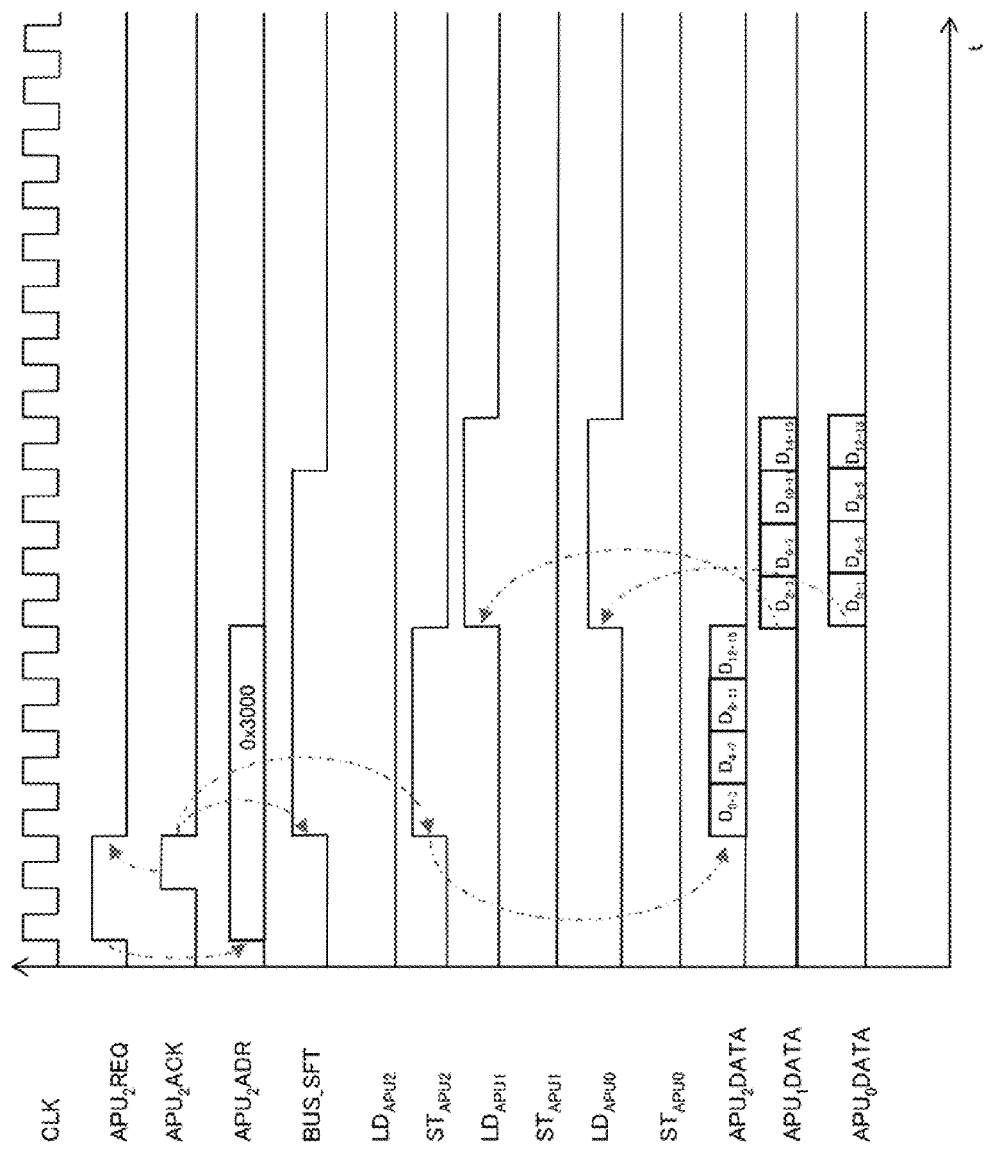
FIG. 6 is an example of a timing chart of a data spreading transfer with the new proposed transfer modes.

Referring to FIG. 6, when using the new proposed transfer sequence "1 to n" (401 in FIG. 4), the data can be sent from $APU_2$ to $APU_0$ and $APU_1$ at the same time by using the full ring bus bandwidth and transferring four data words each clock cycle. Sending at the same time is invoked from $APU_2$ by selecting both destination bits in the upper nibble of the address signal $APU_2ADR$ at the same time. "0x3000" for $APU_2ADR$ in FIG. 6 is a combined address and control signal, and means address 0 in $APU_0$ and $APU_1$. This reduces the number of clock cycles to 10.

Comparative Example 2

Figure 7:
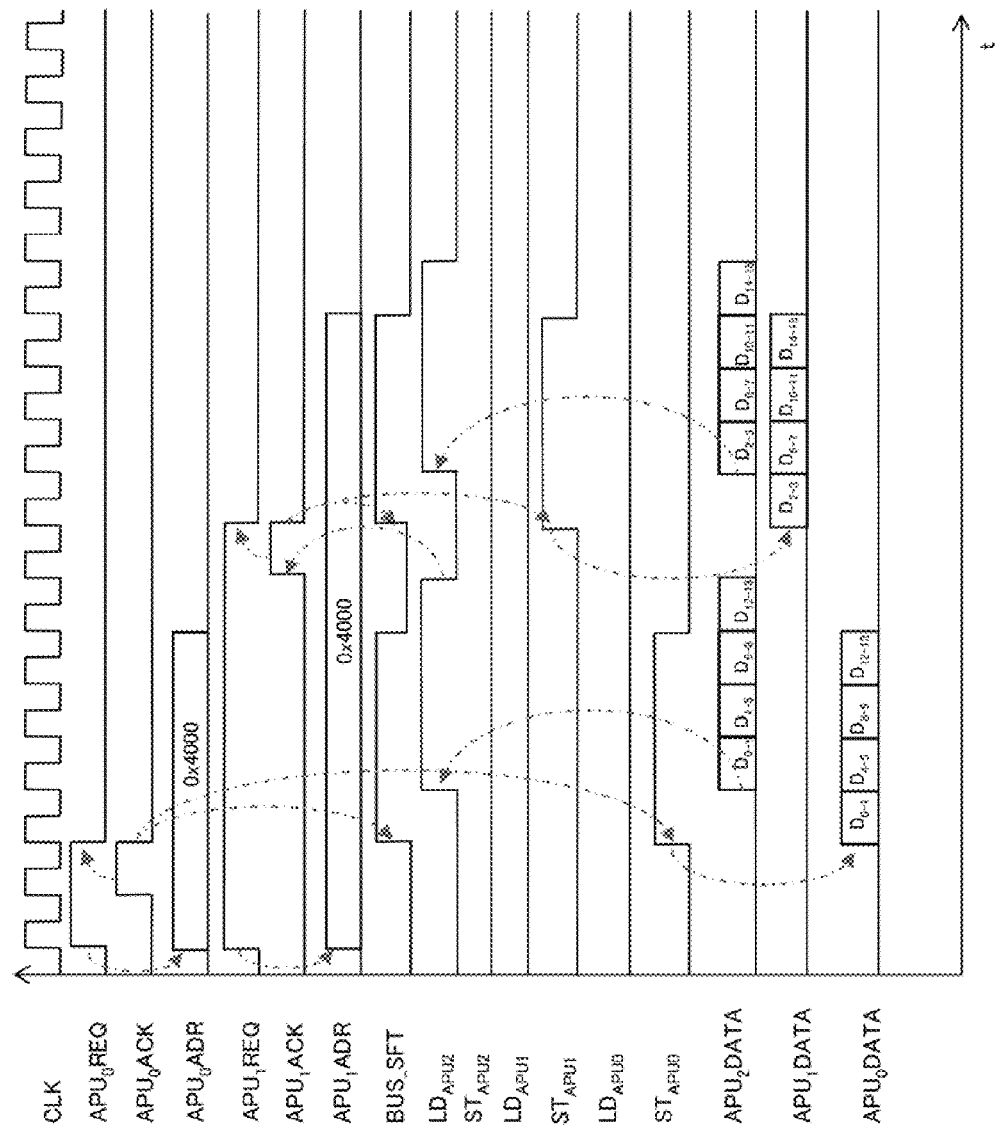
FIG. 7 is a timing chart (comparative example) of a data collection transfer with conventional transfer modes

Referring to FIG. 7, for a data collection transfer to $APU_2$ at the end of a parallel data processing in $APU_0$ and $APU_1$, in a conventional architecture the data has to be transferred sequentially to $APU_2$, where first the data from $APU_0$ and then from $APU_1$ is transferred, which takes 13 clock cycles. First, $APU_0$ and $APU_1$ are requesting a data transfer to $APU_2$ by setting the signals $APU_0REQ$ and $APU_1REQ$ to 1 and setting the upper nibble of the destination address $APU_0ADR$ and $APU_1ADR$ to 4 ($APU_2$). Each unit is waiting for the acknowledge signal from the MAIN DFCTRL unit to start the data transfer over the ring bus. In a conventional architecture, these acknowledge signals are coming one after each other, so that, as shown in this example, first $APU_0$ and then $APU_1$ can transfer the data to $APU_2$.

Example 2

Figure 8:
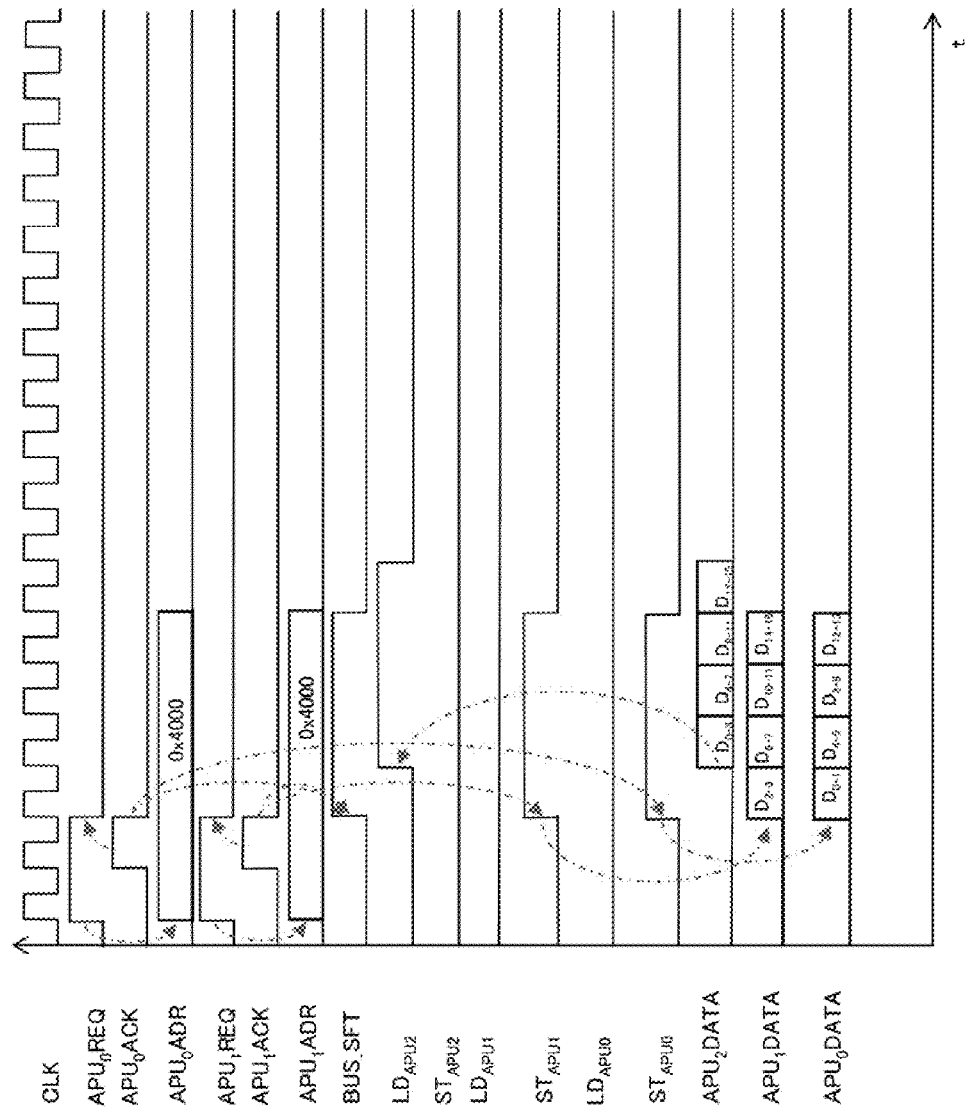
FIG. 8 is an example of a timing chart of a data collection transfer with the new proposed transfer modes.

Referring to FIG. 8, when using the new proposed transfer sequence "n to 1", this transfer can be done in parallel, which reduces the number of necessary clock cycles over the pipelined ring bus to 7. This parallel transfer is possible, because the architecture supports the controlling for a transfer with multiple sources.

Comparative Example 3

Another typical class of algorithm where the new proposed transfer mode "1 to n" can be effectively used is, where data and associated control signals are generated in one PU and then the output data is divided into data and control signals which have to be processed further in different PU.

As example, $APU_2$ is generating 16 words of output data, which are used as shown in Table 1.

TABLE 1

| data word | usage | unit |
|---|---|---|
| 0 | data | $PE_8, PE_{10}, PE_{12}, PE_{14}$ |
| 1 | data | $PE_9, PE_{11}, PE_{13}, PE_{15}$ |
| 2 | control signals | $APU_0$ |
| 3 | control signals | $APU_0$ |
| 4 | data | $PE_8, PE_{10}, PE_{12}, PE_{14}$ |
| 5 | data | $PE_9, PE_{11}, PE_{13}, PE_{15}$ |
| 6 | control signals | $APU_0$ |
| 7 | control signals | $APU_0$ |
| 8 | data | $PE_8, PE_{10}, PE_{12}, PE_{14}$ |
| 9 | data | $PE_9, PE_{11}, PE_{13}, PE_{15}$ |
| 10 | control signals | $APU_0$ |
| 11 | control signals | $APU_0$ |
| 12 | data | $PE_8, PE_{10}, PE_{12}, PE_{14}$ |
| 13 | data | $PE_9, PE_{11}, PE_{13}, PE_{15}$ |
| 14 | control signals | $APU_0$ |
| 15 | control signals | $APU_0$ |

Figure 9:
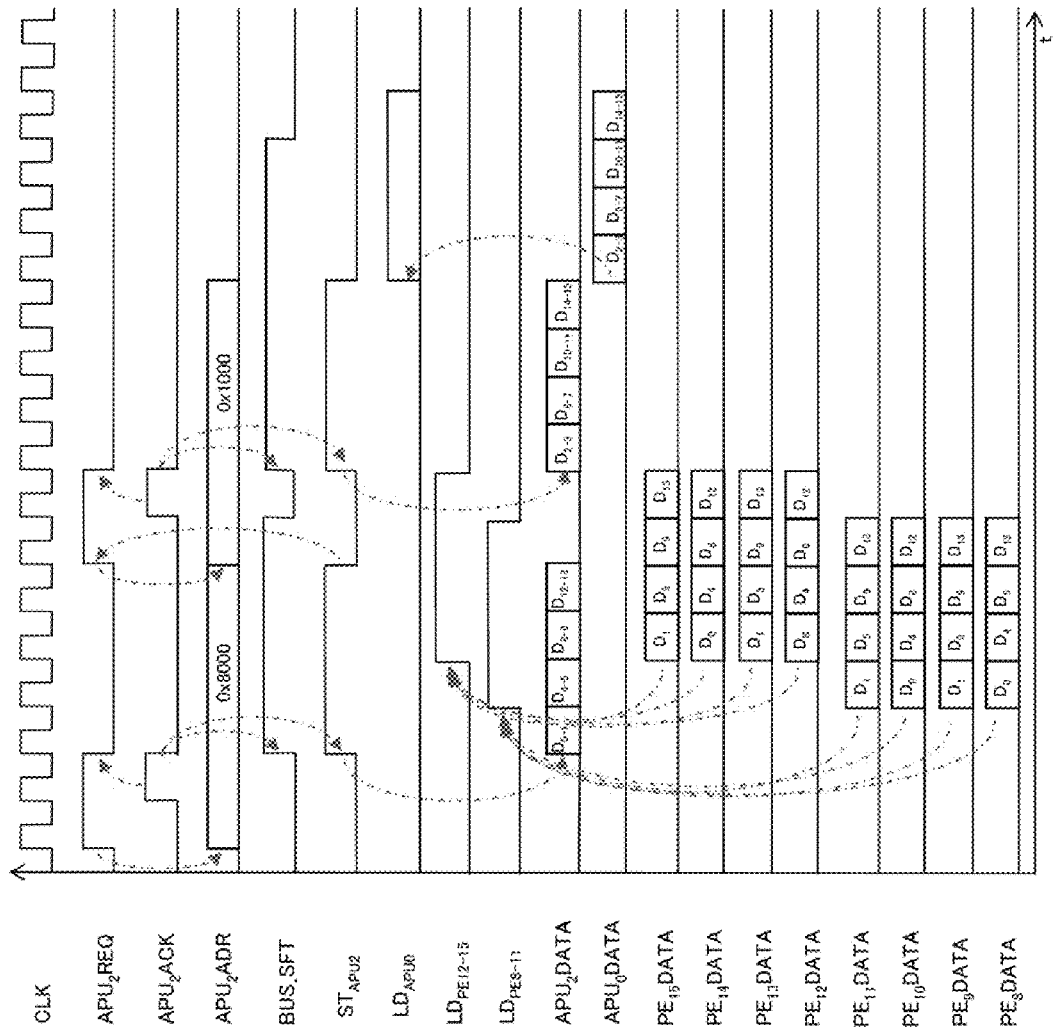
FIG. 9 is a timing chart (comparative example) of a transfer of data and associated control signals with conventional transfer modes.

Referring to FIG. 9, in case of a conventional architecture the transfer would only use half of the ring bus bandwidth by transferring two data words each clock cycle, where both transfers run one after each other transferring first eight data words from $APU_2$ to the SIMD PE array and then eight data words from $APU_2$ to $APU_0$. With the pipeline registers between the processing units this takes overall 16 clock cycles.

Example 3

Figure 10:
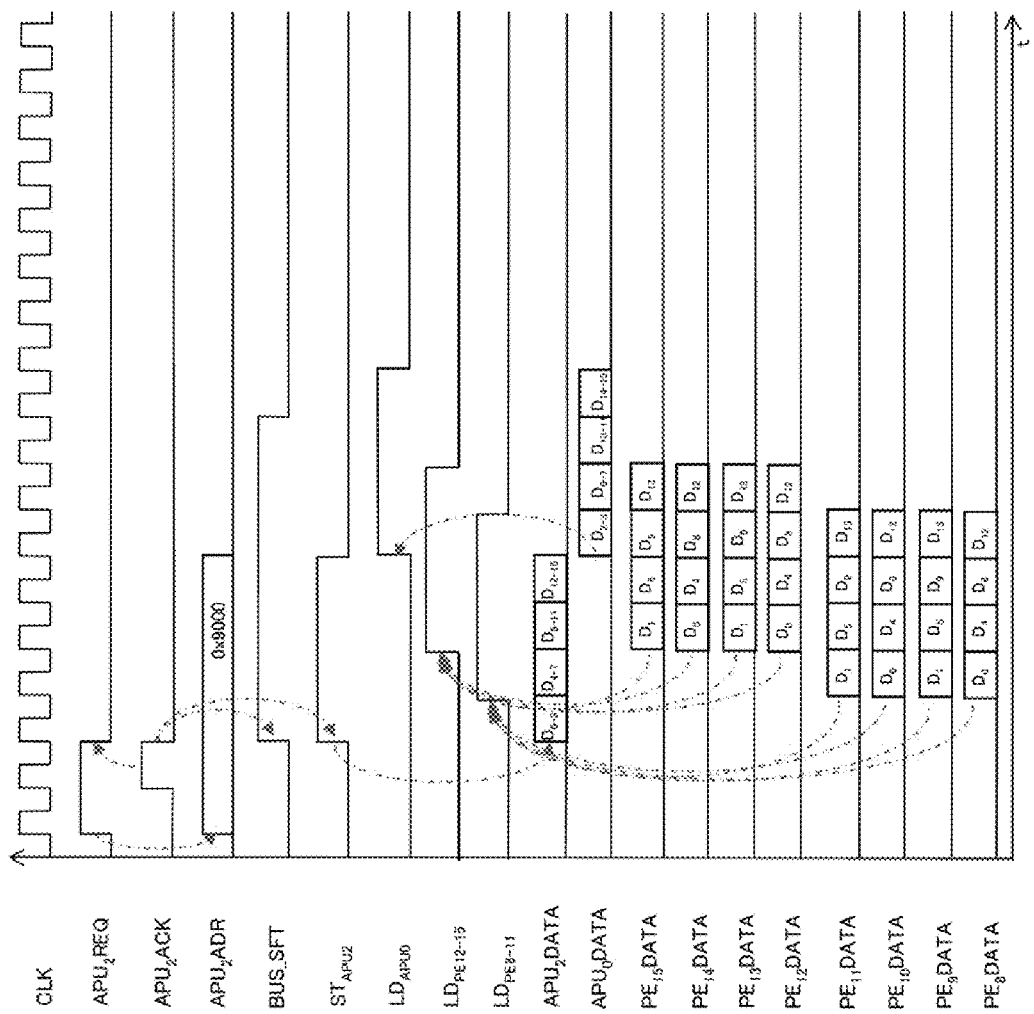
FIG. 10 is an example of a timing chart of a transfer of data and associated control signals with the new proposed transfer modes.

Referring to FIG. 10, when using the new proposed transfer sequences, the data can be sent from $APU_2$ to the SIMD PE array and $APU_0$ at the same time by using the full ring bus bandwidth and transferring four data words each clock cycle, which reduces the number of necessary clock cycles to 10.

INDUSTRIAL APPLICABILITY

This invention can be used to achieve a high performance processor design in low cost for embedded systems.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A processing system having an architecture with a base bandwidth $B_B$, the processing system comprising:
   a pipelined network connection formed as a ring with a bandwidth $B_{BUS}$ which is a multiple of the base bandwidth $B_B$ and with ($B_{BUS}/B_B$) being a natural number larger than 1, where "/" represents integer division, to enable a possibility to transfer multiple data sets with the base bandwidth $B_B$ at a same time;
   processing elements with a possibly different bandwidth connection ($X_{PE}*B_B$) with $X_{PE}$ being a natural number larger than 0 to said pipelined ring network;
   processing units, formed of one or several processing elements which are grouped and controlled together, with a different bandwidth connection ($x_{PU}*B_B$) with $x_{PU}$ being a natural number larger than 0 to said pipelined ring network; and
   a control apparatus controlling over said pipelined ring network;
   a fast data spreading transfer mode with one sending processing unit and a plurality of receiving processing units, wherein a bandwidth connection of the sending processing unit equals a sum of bandwidth connections of the plurality of receiving processing units; and/or
   a fast data collection transfer mode with a plurality of sending processing units and one receiving processing unit, wherein a sum of bandwidth connections of the sending processing units equals a bandwidth connection of the receiving processing unit.

2. The processing system defined in claim 1, wherein a said processing unit can work in a single instruction multiple data (SIMD) style.

3. The processing system defined in claim 1, further comprising:
   a global control unit with access control lines that controls and arbitrates data transfer demands coming from said processing units by executing data flow control sequences.

4. The processing system defined in claim 3, wherein the global control unit executes a data flow control sequence, where data is transferred in a fast data transfer mode from a single said processing unit to a plurality of said processing units with equal sender and receiver bandwidth B with
   a.) (B % $B_B$)==0, where "%" represents modulo operation and
   b.) (B/$B_B$) is a natural number larger than 1, where "/" represents integer division and
   c.) (B<=$B_{Bus}$).

5. The processing system defined in claim 3, wherein the global control unit executes a data flow control sequence, where data is transferred in a fast data transfer mode from a plurality of said processing units to a single said processing unit with equal sender and receiver bandwidth B with
   a.) (B % $B_B$)==0, where "%" represents modulo operation and
   b.) (B/$B_B$) is a natural number larger than 1, where "/" represents integer division and
   c.) (B<=$B_{BUS}$).

6. The processing system defined in claim 4, wherein groups of processing elements can be arranged at run time to processing units.

7. The processing system defined in claim 6, wherein processing elements are configurable at run time to said SIMD or non-SIMD style.

8. A processing method using an architecture with a base bandwidth $B_B$, the processing method comprising:
   providing a pipelined network connection formed as a ring with a bandwidth $B_{BUS}$ which is a multiple of the base bandwidth $B_B$ and with ($B_{BUS}/B_B$) being a natural number larger than 1, where "/" represents integer division, to enable the possibility to transfer multiple data sets with the base bandwidth $B_B$ at the same time;
   connecting processing elements with a possibly different bandwidth connection ($x_{PE}*B_B$) with $X_{PE}$ being a natural number larger than 0 to said pipelined ring network;
   connecting processing units, formed of one or several processing elements which are grouped and controlled together, with a different bandwidth connection ($x_{PU}*B_B$) with $X_{PU}$ being a natural number larger than 0 to said pipelined ring network and a control apparatus;
   wherein said control apparatus controls over said pipelined ring network;

a fast data spreading transfer mode with one sending unit and a plurality of receiving processing units, wherein the bandwidth connection of the sending processing unit equals the sum of the bandwidth connections of the plurality of receiving processing units; and/or a fast data collection transfer mode with a plurality of sending processing units and one receiving processing unit, wherein the sum of the bandwidth connections of the sending processing units equals the bandwidth connection of the receiving processing unit.

9. The processing method defined in claim 8, wherein a said processing unit can work in a single instruction multiple data (SIMD) style.

10. The processing method defined in claim 8, further comprising:

controlling and arbitrating the data transfer demands coming from said processing units by executing data flow control sequences.

11. The processing method defined in claim 10, wherein said controlling comprises execution of a data flow control sequence, where data is transferred in a fast data transfer mode from a single said processing unit to a plurality of said processing units with equal sender and receiver bandwidth B with a.) $(B \% B_B)=0$, where "%" represents modulo operation and b.) $(B/B_B)$ is a natural number larger than 1, where "/" represents integer division and c.) $(B<=B_{BUS})$.

12. The processing method defined in claim 10, wherein said controlling comprises execution of a data flow control sequence, where data is transferred in a fast data transfer mode from many said processing units to a single said processing unit with equal sender and receiver bandwidth B with a.) $(B \% B_B)=0$, where "%" represents modulo operation and b.) $(B/B_B)$ is a natural number larger than 1, where "/" represents integer division and c.) $(B<=B_{BUS})$.

13. The processing method defined in claim 11, wherein groups of processing elements can be arranged at run time to processing units.

14. The processing method defined in claim 13, wherein processing elements are configurable at run time to said SIMD or non-SIMD style.

15. The processing method defined in claim 8, wherein data which is generated in one processing unit is divided in smaller parts which are transferred to multiple processing units at a same time.

16. The processing method defined in claim 8, wherein data which is generated in multiple processing units is transferred at a same time to one processing unit where it is collected for further processing.

17. The processing method in claim 8, wherein data and associated control data are generated in one processing unit then divided and transferred at a same time to different processing unit where it is needed for further processing.

* * * * *